(12) United States Patent
Doddaiah

(10) Patent No.: US 11,698,744 B2
(45) Date of Patent: Jul. 11, 2023

(54) DATA DEDUPLICATION (DEDUP) MANAGEMENT

(71) Applicant: EMC IP Holding Company LLC, Hopkinton, MA (US)

(72) Inventor: Ramesh Doddaiah, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/079,702

(22) Filed: Oct. 26, 2020

(65) Prior Publication Data

US 2022/0129184 A1     Apr. 28, 2022

(51) Int. Cl.
G06F 3/06       (2006.01)

(52) U.S. Cl.
CPC ............ G06F 3/0652 (2013.01); G06F 3/061 (2013.01); G06F 3/067 (2013.01)

(58) Field of Classification Search
None
See application file for complete search history.

(56) References Cited

U.S. PATENT DOCUMENTS

| | | | | |
|---|---|---|---|---|
| 8,732,403 | B1 * | 5/2014 | Nayak | G06F 3/0619 711/170 |
| 9,292,894 | B2 * | 3/2016 | MacIntosh | G06T 1/0021 |
| 9,565,609 | B2 * | 2/2017 | Kuusilinna | G01S 5/02 |
| 9,715,434 | B1 * | 7/2017 | Xu | G06F 3/067 |
| 9,986,282 | B2 * | 5/2018 | MacIntosh | H04N 21/4331 |
| 10,108,543 | B1 * | 10/2018 | Duggal | G06F 11/1453 |
| 10,108,544 | B1 * | 10/2018 | Duggal | G06F 11/14 |
| 10,795,812 | B1 * | 10/2020 | Duggal | G06F 3/067 |
| 2008/0144079 | A1 * | 6/2008 | Pandey | H03M 7/30 358/1.15 |
| 2010/0077013 | A1 * | 3/2010 | Clements | G06F 16/1748 707/822 |
| 2010/0088296 | A1 * | 4/2010 | Periyagaram | G06F 16/183 707/E17.014 |

(Continued)

FOREIGN PATENT DOCUMENTS

| CN | 105809284 A | * | 7/2016 | ............ G06Q 10/04 |
|---|---|---|---|---|
| CN | 109787197 A | * | 5/2019 | |

OTHER PUBLICATIONS

Esmaeil Alizadeh, "An Illustrative Introduction to Dynamic Time Warping", Oct. 11, 2020, pp. 1-15, https://towardsdatascience.com/an-illustrative-introduction-to-dynamic-time-warping-36aa98513b98 (Year: 2020).*

(Continued)

*Primary Examiner* — Christopher D Birkhimer
(74) *Attorney, Agent, or Firm* — Krishnendu Gupta; Nikhil Patel

(57) ABSTRACT

Aspects of the present disclosure relate to data deduplication (dedup) techniques for storage arrays. At least one input/output (IO) operations in an IO workload received by a storage array can be identified. Each of the IOs can relate to a data track of the storage array. a probability of the at least one IO being similar to a previous stored IO can be determined. A data deduplication (dedup) operation can be performed on the at least one IO based on the probability. The probability can be less than one hundred percent (100%).

20 Claims, 6 Drawing Sheets

(56) References Cited

U.S. PATENT DOCUMENTS

| | | | | |
|---|---|---|---|---|
| 2010/0125553 | A1* | 5/2010 | Huang | G06F 11/1453 707/661 |
| 2010/0174881 | A1* | 7/2010 | Anglin | G06F 11/1453 711/E12.103 |
| 2010/0281081 | A1* | 11/2010 | Stager | G06F 9/5022 707/814 |
| 2010/0333116 | A1* | 12/2010 | Prahlad | G06F 3/067 713/153 |
| 2013/0308818 | A1* | 11/2013 | MacIntosh | H04N 21/44008 382/100 |
| 2014/0100806 | A1* | 4/2014 | Good | G05B 23/0237 702/82 |
| 2015/0103806 | A1* | 4/2015 | Kuusilinna | H04W 64/00 370/332 |
| 2015/0205816 | A1* | 7/2015 | Periyagaram | G06F 11/1453 707/827 |
| 2015/0261776 | A1* | 9/2015 | Attarde | G06F 16/1748 707/664 |
| 2016/0269772 | A1* | 9/2016 | MacIntosh | H04N 21/4305 |
| 2016/0350324 | A1* | 12/2016 | Wang | G06F 16/137 |
| 2017/0038978 | A1* | 2/2017 | Li | G06F 3/0611 |
| 2018/0314727 | A1* | 11/2018 | Epstein | G06N 5/003 |
| 2019/0094322 | A1* | 3/2019 | Braun | G01R 33/56 |
| 2020/0310686 | A1* | 10/2020 | Truong | G06F 3/067 |
| 2021/0374021 | A1* | 12/2021 | Santhakumar | G06F 11/3485 |

OTHER PUBLICATIONS

Eric Nussbaumer, "Let's Do the Time Warp Again: Investigating the use of Dynamic Time Warping to test correlation between time series", Mar. 16, 2020, pp. 1-8, https://e-baumer.github.io/2020-03-16-dynamic-time-warp/ (Year: 2020).*

Will Kenton, "What Is a Time Series?", Mar. 31, 2020, pp. 1-5, https://web.archive.org/web/20200419034248/https://www.investopedia.com/terms/t/timeseries.asp (Year: 2020).*

Thomas A. Herring et al., "Advancing time series comparison and analysis for application to the Community Geodetic Model", Mar. 14, 2016, pp. 1-9, https://files.scec.org/s3fs-public/15086report.pdf (Year: 2016).*

Amis Kirshners et al., "A Comparative Analysis of Short Time Series Processing Methods", Oct. 2012, pp. 1-6, https://www.researchgate.net/publication/234838605_A_Comparative_Analysis_of_Short_Time_Series_Processing_Methods (Year: 2012).*

Jianchao Zeng et al., "Data Science", 6th International Conference of Pioneering Computer Scientists, Engineers and Educators, Sep. 18-21, 2020, pp. 1-738, https://link.springer.com/content/pdf/10.1007/978-981-15-7981-3.pdf (Year: 2020).*

* cited by examiner

DATA DEDUPLICATION (DEDUP) MANAGEMENT

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data. Storage arrays can establish data dedup techniques to maximize capacity of their storage drives. Data deduplication techniques eliminate redundant data in a data set. The techniques can include identifying copies of the same data and deleting the copies such that only one copy remains.

SUMMARY

Aspects of the present disclosure relate to data deduplication (dedup) techniques for storage arrays. In embodiments, at least one input/output (IO) operations in an IO workload received by a storage array can be identified. Each of the IOs can relate to a data track of the storage array. a probability of the at least one IO being similar to a previous stored IO can be determined. A data deduplication (dedup) operation can be performed on the at least one IO based on the probability. The probability can be less than one hundred percent (100%).

In embodiments, a unique fingerprint representing the set of sequential IOs can be generated. Further, the unique fingerprint can be stored in a searchable data structure.

In embodiments, a temporal dimension of the set of sequential IOs can be analyzed.

In embodiments, a unique fingerprint representing the set of sequential IOs can be converted into a time series fingerprint.

In embodiments, the time series fingerprint can be compared with the previously stored set of sequential IOs' time series fingerprint.

In embodiments, a comparison technique between at least a subset of tracks related to the time series fingerprint and a corresponding subset of tracks related to the previously stored set of sequential IOs' time series fingerprint can be performed.

In embodiments, a number of tracks to include in a subset track comparison based on a threshold statistical relevancy can be selected.

In embodiments, the probability of the similarity between the at least one set of sequential IOs and the previously stored set of sequential IOs can be determined based on a number of matching tracks identified by the comparison technique.

In embodiments, the comparison technique can be performed using a time series similarity comparison algorithm. The time series similarity comparison system can include dynamic time warp (DTW) algorithm.

In embodiments, the data dedup operation can be performed on the at least set of sequential IOs based an analysis of the similarity probability and a probability threshold.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Storage arrays can establish data dedup techniques to maximize capacity of their storage drives. Data deduplication techniques eliminate redundant data in a data set. The techniques can include identifying copies of the same data and deleting the copies such that only one copy remains.

To identify duplicated data, the techniques can generate fingerprint for each track of data stored on a storage array and store them in a hash table. The current techniques then perform a comparison of fingerprints generated to represent track data write IOs and fingerprints stored in the hash table and reads matching stored disk data and performs brute force byte by byte comparison with new write data. Because the brute force comparison is applied to each data track, the resource cost of the storage array is very high. Specifically, the brute force comparison is a byte to byte comparison which consumes a costly amount of array resources during peak workloads. Furthermore, the brute force comparison unnecessarily wastes disk bandwidth and memory bandwidth.

Aspects of the present disclosure reduce a need to use byte to byte comparison techniques by, e.g., converting each fingerprint per track into a time series and by running a time series comparison algorithm for all (or subset of) the tracks involved in at least one incoming IO operation. In embodiments, at least one input/output (IO) operation in an IO workload received by a storage array can be identified. Each of the IOs can relate to a data track of the storage array. a probability of the at least one IO being similar to a previous stored IO can be determined. A data deduplication (dedup) operation can be performed on the at least one IO based on the probability. The probability can be less than one hundred percent (100%).

Figure 1:
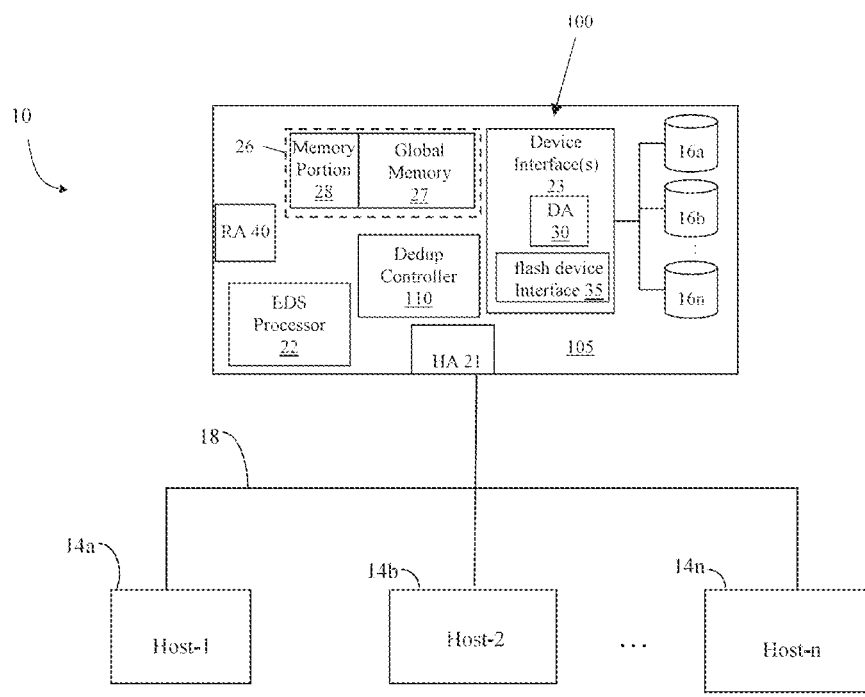
FIG. 1 is a block diagram of a storage system in accordance with example embodiments disclosed herein.

Referring to FIG. 1, shown is an example of an embodiment of a system 10 that can be used in connection with performing the embodiments described herein. The system 10 includes a data storage array 105 connected to host systems 14a-n through communication medium 18. The storage array 105 can include components 100 configured to perform data storage operations.

In embodiments, the hosts 14a-n can access the data storage array 105, for example, to perform input/output (IO) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host 14a-n can access and communicate with the data storage array 105. The hosts 14a-n can also communicate with other components included in the system 10 via the communication medium 18.

Each of the hosts 14a-n and the data storage array 105 can be connected to the communication medium 18 by any one of a variety of connections as can be provided and supported in accordance with the type of communication medium 18. The processors included in the hosts 14a-n can be any one of a variety of proprietary or commercially available single or multi-processor system, such as an Intel-based processor, or other type of commercially available processor able to support traffic in accordance with each embodiment and application.

It should be noted that the examples of the hardware and software that can be included in the data storage array 105 are described herein in more detail and can vary with each embodiment. Each of the hosts 14a-n and data storage array 105 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, Non-Volatile Memory Express (NVMe), and the like. Some or all the connections by which the hosts 14a-n and data storage array 105 can be connected to the communication medium can pass through other communication devices, such switching equipment that can exist such as a phone line, a repeater, a multiplexer or even a satellite.

Each of the hosts 14a-n can perform different types of data operations in accordance with different types of tasks. In embodiments, any one of the hosts 14a-n can issue a data request to the data storage array 105 to perform a data operation. For example, an application executing on one of the hosts 14a-n can perform a read or write operation resulting in one or more data requests to the data storage array 105.

It should be noted that although array 105 is illustrated as a single data storage array, array 105 can represent multiple data storage arrays alone, or in combination with, other data storage devices, systems, appliances, and/or components having suitable connectivity, such as in a SAN, in an embodiment using the embodiments herein. It should also be noted that an embodiment can include data storage arrays or other components from one or more vendors. In subsequent examples illustrated the embodiments herein, reference can be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage array 105 can be a data storage array including a plurality of data storage devices 16a-n. The data storage devices 16a-n can include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, can also be referred to as a RAM drive. SSD can refer to solid state electronics devices as distinguished from electromechanical devices, such as hard drives, having moving parts. Flash devices or flash memory based SSDs are one type of SSD that contains no moving parts. The embodiments described herein can be used in an embodiment in which one or more of the devices 16a-n are flash drives or devices. More generally, the embodiments herein can also be used with any type of SSD although following paragraphs can refer to a particular type such as a flash device or flash memory device.

The data storage array 105 can also include different types of adapters or directors, such as an HA 21 (host adapter), RA 40 (remote adapter), and/or device interface 23. Each of the adapters HA 21, RA 40 can be implemented using hardware including a processor with local memory with code stored thereon for execution in connection with performing different operations. The HA 21 can be used to manage communications and data operations between one or more host systems 14a-n and the memory 26 which can include a global memory (GM) 27 and a memory portion 28. In an embodiment, the HA 21 can be a Fibre Channel Adapter (FA) or another adapter which facilitates host communication. The HA 21 can be characterized as a front-end component of the data storage array 105 which receives a request from one or more of the hosts 14a-n. The data storage array 105 can include one or more RAs (e.g., RA 40) that can be used, for example, to facilitate communications between data storage arrays. The data storage array 105 can also include one or more device interfaces 23 for facilitating data transfers to/from the data storage devices 16a-n. The data storage interfaces 23 can include device interface modules, for example, one or more disk adapters (DAs) 30 (e.g., disk controllers), flash drive interface 35, and the like. The DA 30 can be characterized as a back-end component of the data storage array 105 which interfaces with the physical data storage devices 16a-n.

One or more internal logical communication paths can exist between the device interfaces 23, the RAs 40, the HAs 21, and the memory 26. An embodiment, for example, can use one or more internal buses and/or communication modules. For example, the global memory 27 can be used to facilitate data transfers and other communications between the device interfaces, HAs and/or RAs in a data storage array. In one embodiment, the device interfaces 23 can perform data operations using a cache that can be included in the global memory 27, for example, when communicating with other device interfaces and other components of the data storage array. Memory portion 28 is a portion of memory 26 that can be used in connection with other designations that can vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14a-n provide data and access control information through channels (e.g., via communications medium 18) to the storage array 105 can also provide data to the host systems 14a-n also through the channels. In embodiments, the host systems 14a-n are configured to indirectly address the drives or devices 16a-n via one or more logical devices or logical volumes (LVs). The LVs can correspond to the actual physical devices or drives 16a-n. For example, one or more LVs can reside on a single physical drive or multiple drives. Data in a single data storage system, such as a single data storage array 105, can be accessed by multiple hosts allowing the hosts to share the data residing therein. The HA 21 can be used in connection with communications between a data storage array 105 and one or more of the host systems 14*a*-*n*. The RA 40 can be used in facilitating communications between two data storage arrays. The DA 30 can be one type of device interface used in connection with facilitating data transfers to/from the associated disk drive(s) 16*a*-*n* and LV(s) residing thereon. A flash device interface 35 can be another type of device interface used in connection with facilitating data transfers to/from the associated flash devices and LV(s) residing thereon. It should be noted that an embodiment can use the same or a different device interface for one or more different types of devices than as described herein.

The device interface, such as a DA 30, performs IO operations on a drive 16*a*-*n*. In the following description, data residing on an LV can be accessed by the device interface following a data request in connection with IO operations that other directors originate. Data can be accessed by LV in which a single device interface manages data requests in connection with the different one or more LVs that can reside on a drive 16*a*-*n*. For example, a device interface can be a DA 30 that accomplishes the foregoing by creating job records for the different LVs associated with a device. These different job records can be associated with the different LVs in a data structure stored and managed by each device interface.

The array 105 can further include a dedup controller 110 configured to perform one or more storage optimization techniques. For example, the controller 110 can perform one or more dedup techniques based on an analysis of, e.g., historical/current telemetry data, and historical/real-time IO workloads. In embodiments, the controller 110 can perform a data deduplication (dedup) operation on at least one IO based on a probability the at least one IO is similar to a previous stored IO as described in greater detail herein.

Although the dedup controller 110 is illustrated as being a component included in the array 105, the controller 110 can exist external to the data storage array 105 and can communicate with the data storage array 105 using any one of a variety of communication connections. In other embodiments, the dedup controller 110 can exist internal to an Enginuity Data Services (EDS) processor 22 and consume shared resources of the EDS 22, e.g., share the array's processing resources. In one embodiment, the dedup controller 110 can communicate with the data storage array 105 through several different connections including, but not limited to, a serial port, a parallel port, and a network interface card via an Ethernet connection. Using the Ethernet connection, for example, the dedup controller 110 can communicate directly with DA 30 and HA 21 within the data storage array 105.

Figure 2:
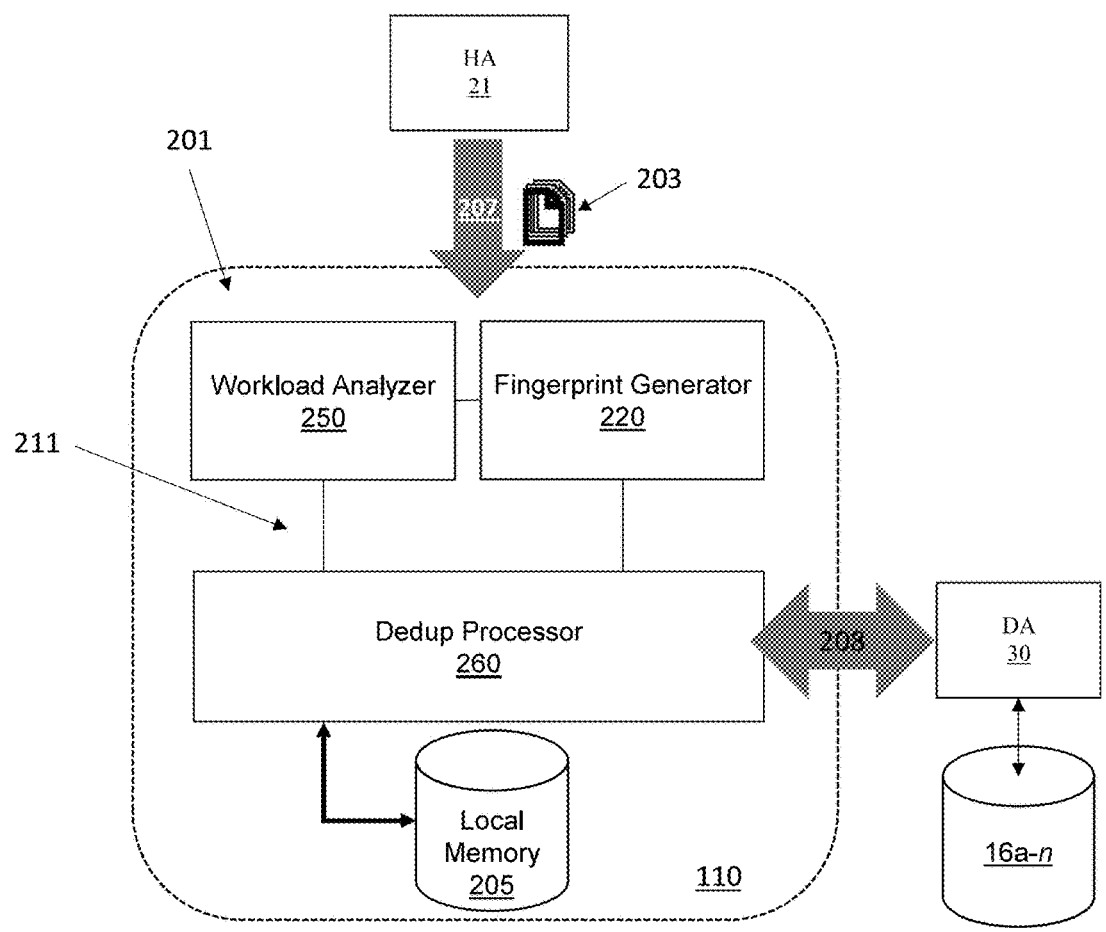
FIG. 2 is a block diagram of a data deduplication (dedup) controller in accordance with example embodiments disclosed herein.

Referring to FIG. 2, a storage array can include a dedup controller 110 communicatively coupled to an HA 21, e.g., via a Fibre channel 207. It should be noted that the dedup controller 110 and/or any of its elements 200 201 (e.g., software and hardware elements) can be any one of a variety of commercially available processors, such as an Intel-based processor, and the like. Allow the elements 200 are illustrated in the dedup controller 110, all or portions of the elements 200 can also reside elsewhere such as, for example, on HA 21, EDS 22, and DA 30 of FIG. 1. In other examples, the dedup controller 110 can be a parallel processor such as a graphical processing unit (GPU).

In embodiments, the host adapter 21 includes one or more ports (not shown) configured to transmit/receive IOs to/from one or more hosts devices 14*a*-*n*. The HA 21 can include one or more ports (not shown) that include unique identifiers. In embodiments, the array 105 can map each identifier to one or more of the hosts 14*a*-*n* and applications operated by the hosts 14*a*-*n*. Based on the identifier, the array 105 can determine one or more characteristics of each received IO. A characteristic can include a service level (SL), performance expectation, quality of service (QoS), size, type (e.g., read vs write), and the like. In response to receiving an IO, the HA 21 can identify one or more data tracks that provide storage services to data involved with the IO. In other examples, the array 105 can receive the data involved with in IO for a first time. In such circumstances, the DA 30 can assign one or more data tracks of at least one of the storage devices 16*a*-*n* storage device to provide storage services. A data track can correspond a location of one or more of the storage devices 16*a*-*n*.

In response to receiving an IO operation including a data write request via, e.g., the Fibre channel 207, the dedup controller 110 can provide data deduplication services to optimize the array's storage capacity (e.g., efficiently control utilization of storage resources). For example, the controller 110 can perform one or more dedup operations that reduce an impact of redundant data on storage costs. In an example, one or more of the hosts 14*a*-*n* can use the array 105 to store email that can include one or more attachments. Accordingly, the email and its attachments can require several data tracks of storage. In some scenarios, a first host 14*a* may have previously requested the array 105 to store the email and its attachments. Later, the first host 14*a* can forward the email to a second host 14*b*. In response to receiving the email, the second host 14*b* may issue an IO to the array 105 that includes a request to store the email. Using a data deduplication technique, the controller 110 can determine that the email is a duplicate of the previously stored email and discard the email. By using data deduplication, the controller 110 is able to conserve the array's storage capacity.

In embodiments, the controller 110 can include a workload analyzer 250 can be communicatively coupled to the HA 21 via a communicative primitive such as Fibre Channels and NVMe (Non-Volatile Memory Express) communication interfaces 207. The analyzer 250 can receive storage telemetry data corresponding to the array and/or its components 100 from the EDS processor 22 of FIG. 1. In examples, the analyzer 250 can include logic and/or circuitry configured to analyze the one or more IO workloads 203 received from the HA 21. The analysis can include identifying one or more characteristics of each IO of the workload 203. For example, each IO can include metadata including information associated with an IO type, data track related to the data involved with each IO, time, performance metrics, and telemetry data, amongst other storage array IO related information. Based on historical and/or current IO characteristic data, the analyzer 250 can identify IO patterns using, e.g., one or more machine learning (ML) techniques. Using the identified IO patterns, the analyzer 250 can determine whether the array 105 is experience an intensive IO workload. The analyzer 250 can identify the IO workload 203 as being intensive if it includes one or more periods during with the array 105 receives a large volume of IOs per second (IOPS). For any IO associated with an intensive workload, the analyzer 250 can include an indication of the association in the IO's metadata.

In embodiments, the controller 110 can include a fingerprint generator 230 that segments the data involved with a current IO into one or more data portions. Each segmented data portion can correspond to a size of one or more of the data tracks of the devices 16a-n. For each segmented data portion, the generator 230 can generate a data segment fingerprint. Additionally, the generator 230 can generate data track fingerprints representing the data of each data track identified in the current IO's metadata. For example, each IO can include one or more LVs and/or logical unit numbers (LUNs) representing the data tracks that are allocated to provide storage services for the data involved with the IO. The fingerprints can have a data format optimized (e.g., having characteristics) for search operations. As such, the fingerprint generator 230 can use a hash function to generate a fixed-sized identifier (e.g., fingerprint) from each track's data and segmented data portion. Thereby, the fingerprint generator 230 can restrict searches to fingerprints having a specific length to increase search performances (e.g., speed). Additionally, the generator 30 can determine a size of the fingerprints that reduces a probability of distinct data portions having the same fingerprint. Using such fingerprints, the controller 110 can advantageously consume a minimal amount of the array's processing (e.g., CPU) resources to perform a search.

In embodiments, the controller 110 can include a dedup processor 260 that can perform one or more data deduplication techniques in response to receiving an IO write request. Further, the processor 260 can pause data deduplication operations based on a state of the array 105. For example, the processor 260 perform an array performance check in response to receiving an IO associated with an intensive IO workload. If the array performance check indicates that the array 105 is not meeting at least one performance expectation of one or more of the hosts 14a-n, the processor 260 can halt dedup operations. In other examples, the processor 260 can proceed with performing dedup operations if an IO is not associated with an intensive workload and/or the array is meeting performance expectations and can continue to do so should the processor 260 continue to perform dedup operations.

In response to write data involved with a current IO being associated with one or more previously allocated data tracks, the dedup processor 260 can perform a comparison between one or more portions of the write data and corresponding one or more portions of data previously stored in the previously allocated data tracks using their respective fingerprints. Current naïve data deduplication techniques perform a byte to byte (i.e., brute force) comparison of each fingerprint and disk data. However. Such techniques can consume a significant and/or unnecessary amount of the array's resources (e.g., the array's disk bandwidth, fabric bandwidth, CPU cycles for comparison, memory, and the like). Accordingly, such naïve dedup techniques can cause the array 105 to fail to meet performance expectations of one or more of the hosts 14a-n during peak workloads (e.g., intensive workloads). To avoid such scenarios, the processor 260 can limit a comparison to a subset of the segmented data fingerprints and a corresponding subset of the data track fingerprints.

In further embodiments, the processor 260 can perform a time series comparison between the subset of the segmented data fingerprints and the corresponding subset of the data track fingerprints. In some examples, the processor 260 can perform the time series comparison using a dynamic time warp (DTW) time series comparison technique. By using the DTW technique, the processor 260 can leverage a temporal dimension of one or more IOs in an IO workload 203 to reduce a need to perform byte to byte comparison matching. For example, sequential IOs exhibit a temporal relationship with each of their assigned data tracks. Accordingly, the processor 260 can perform a time dimensional comparison between one or more IOs and their associated data tracks (e.g., IO fingerprints and data track fingerprints) as described in greater detail herein.

In other examples, the processor 260 can generate a first time series data structure that orders the segmented data fingerprints corresponding to a receive timestamp. Additionally, the processor 260 can generate a second time series data structure that orders the data track fingerprints corresponding to write timestamp. In embodiments, the processor 260 can select a number of fingerprints to include in each subset based on a size of the data (e.g., total number of data segments or data tracks). In further embodiments, the processor can select the number of fingerprints to include in each subset based on a statistical confidence as measured by a total sample size (e.g., total number of data segments or data tracks). For example, the processor 260 can determine a multi-track logical block count (LBC) of the storage device 16a-n. Using the LBC, the processor 260 can generate an LBC histogram. Further, the processor 260 can determine a sequence length for each subset based on an LBC frequency identified by the LBC histogram.

In response to a number of matching fingerprints, the processor 260 can identify a probability of whether the data involved with the current IO is a duplicate of data previously stored in the array 105. If the probability is above a threshold, the processor 260 can discard the data. If the probability is less than the threshold, the processor 260 can write the data to the data tracks of the devices 16a-n.

For example, the processor 260 can generate predetermined bytes of fingerprints per portion of a data track (e.g., per quarter of a data track). For each fingerprint byte, the processor 260 can generate a time step representation using a DTW technique. As such, a set of bytes can define a time series. Thus, each data track can produce a number of time steps that can be defined by the data track's size. In some embodiments, the processor 260 can perform the time series comparison in response to detecting a hash collision (e.g., circumstances that involve distinct user data producing matching fingerprints).

Figure 3:
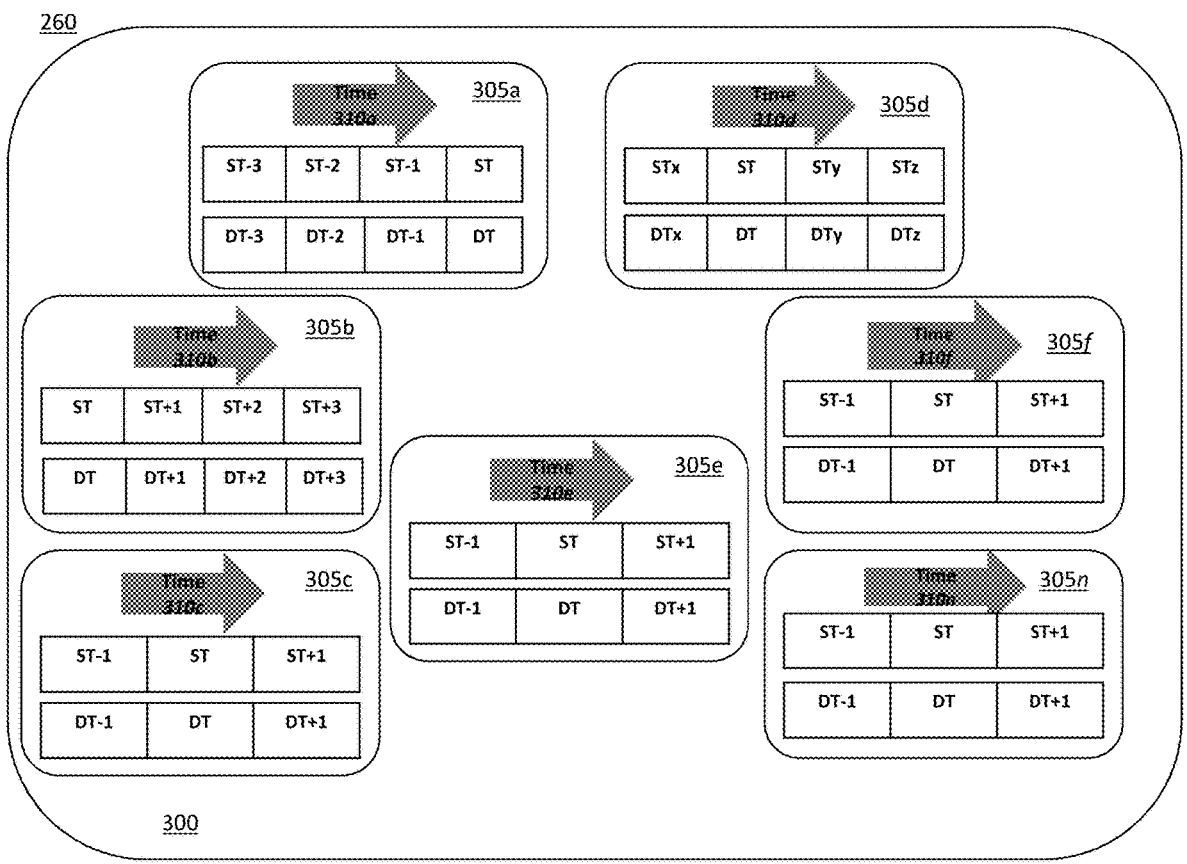
FIG. 3 is a block diagram of a dedup processor in accordance with example embodiments of the present disclosure.

Referring to FIG. 3, the processor 260 can include a policy engine 300 that identify one or more comparison policies 305a-n, 310a-n. The engine 300 can include non-temporal policies 310a-n and temporal policies 305a-n. Each of the policies 305a-n, 310a-n can include unique non-temporal or temporal (e.g., DTW) instructions for comparing the segmented data fingerprints and the data track fingerprints. In embodiments, the engine 300 can select one of the policies 305a-n, 310a-n based on one or more of an analysis performed by the analyzer 250 and/or one or more fingerprint characteristics such as a sequence length and track length.

In response to detecting the hash collision, the engine 300 can select at least one of the policies 305a-n, 315a-n. Each policy 305a-n can include instructions that when executed cause the processor 260 to perform a distinct DTW comparison.

In an embodiment, the engine 300 can include a preceding sequence fingerprint policy 310a that compares preceding tracks from a current track of a sequence. For example, if a current IO corresponds to data tracks DT−3, DT−2, DT−1, and DT (i.e., the sequence length is 4), then the engine 300 can select policy 310a that includes instructions for the processor 260 to compare the segmented data fingerprints ST−3, ST−2, ST−1, ST with data track fingerprints DT−3, DT−2, DT−1, DT, which each respectively define a time series.

In an embodiment, the engine 300 can include a succeeding sequence fingerprint policy 310*b* that compares succeeding tracks from a current track of a sequence. For example, if a current IO corresponds to data tracks DT, DT+2 and DT+3 (i.e., the sequence length is 4), then the engine 300 can select policy 310*b* that includes instructions for the processor 260 to compare the segmented data fingerprints ST, ST+1, ST+2, ST+3 with data track fingerprints DT, DT+1, DT+2, DT+3, which each respectively define a time series.

In an embodiment, the engine 300 can include an exact match fingerprint policy 310*c* that requires an exact match between a set of segmented data fingerprint tracks and data track fingerprints. For example, if a current IO corresponds to data tracks DT−1, DT and DT+1 (i.e., the sequence length is 3), then the engine 300 can select policy 310*c* that includes instructions for the processor 260 to compare the segmented data fingerprints ST−1, ST and ST+1 with data track fingerprints DT−1, DT and DT+1, which each respectively define a time series.

In an embodiment, the engine 300 can include a random track sequence match fingerprint policy 310*d* that requires an exact match between a set of segmented data fingerprint tracks and data track fingerprints. For example, if a current IO corresponds to a single data track, DT (i.e., the sequence length is 1), the engine 300 performs a comparison based on a current IO's size and/or LBC. For instance, the engine can compare a current segmented data fingerprint track, ST, and its immediately preceding and succeeding fingerprint tracks, ST−1 and ST+1, with corresponding data track fingerprints DT−1, DT and DT+1, which each respectively define a time series.

In an embodiment, the engine 300 can include a host IO size match fingerprint policy 310*e* that compares a randomly selected sequence set of the segmented data fingerprint tracks and data track fingerprints. For example, the engine 300 can compare a current segmented data fingerprint track, ST, and a randomly selected sequence set of its preceding and succeeding tracks, STx, Sty, and STz, with their corresponding data tracks, DTx, DT, DTy, and DTz.

In an embodiment, the engine 300 can include an exact linear temporal sequence match policy 310*f* that defines a 1-to-1 sequence matching comparison between one or more segmented data fingerprint tracks and their corresponding data track fingerprints.

In an embodiment, the engine 300 can include a non-exact linear temporal sequence match policy 310*n* that defines a 1-to-1 sequence matching comparison between one or more segmented data fingerprint tracks and their corresponding data track fingerprints.

In another embodiment, the engine 300 can include a non-exact linear temporal match policy 310*n* that determines a probability of a match in response to identifying one or more mismatches. For example, the processor 260 can identify a probability of whether the data involved with the current IO is a duplicate of data previously stored in the array 105. If the probability is above a threshold, the processor 260 can discard the data. If the probability is less than the threshold, the processor 260 can write the data to the data tracks of the devices 16*a-n*.

Figure 3A:
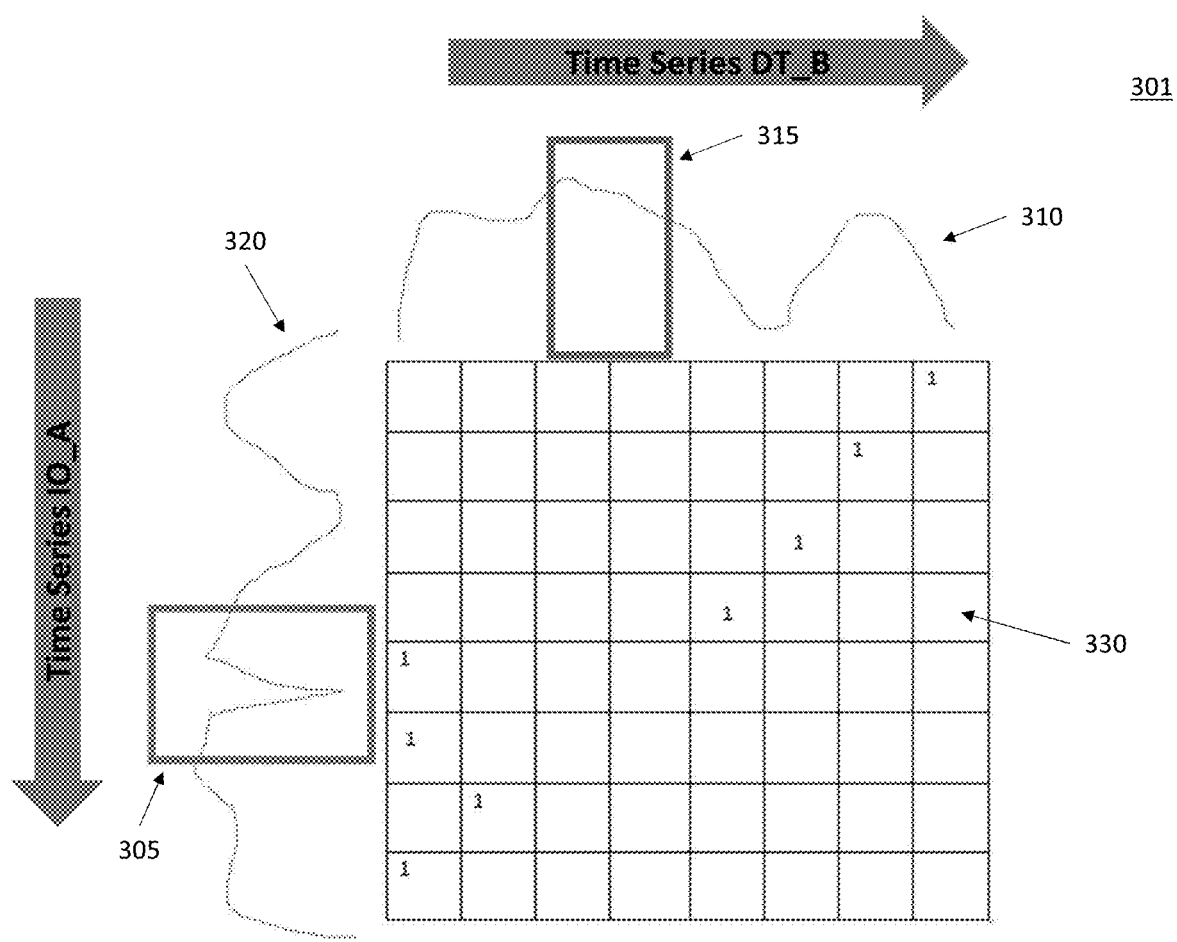
FIG. 3A is a graph illustrating a time series comparison between fingerprints in accordance with example embodiments disclosed herein.

Referring to FIG. 3A, a graph 301 illustrates a comparison between a time series segmented data fingerprint sequence IO_A and a time series data track fingerprint sequence DT_B. As illustrated, both time series sequences IO-A, DT_B match at most time steps 330 except for those time steps defined by a first area 305 and a second area 315. The processor 260 can interpret the first area 305 as defining an insertion of a data check, which, in turn, causes a phase shift defined by the second area 315. Accordingly, the time series sequence IO_A does not synchronize with the time series sequence DT_B. By identifying a phase offset (e.g., the second area 315), the processor 260 can identify that there is a match between the two time series sequences IO_A, DT_B. Further, the processor 260 can establish a predefined or dynamically determined threshold match. Thus, the processor 260 can identify those having a match percentage above the threshold as a match (i.e., data that can be discarded), while and those below a threshold as a mismatch (i.e., unique data set requiring storage).

Although several example comparison policies are identified, a skilled artisan understands that many other known or yet to be known time series comparison policies can be included in the engine 300.

Figure 4:
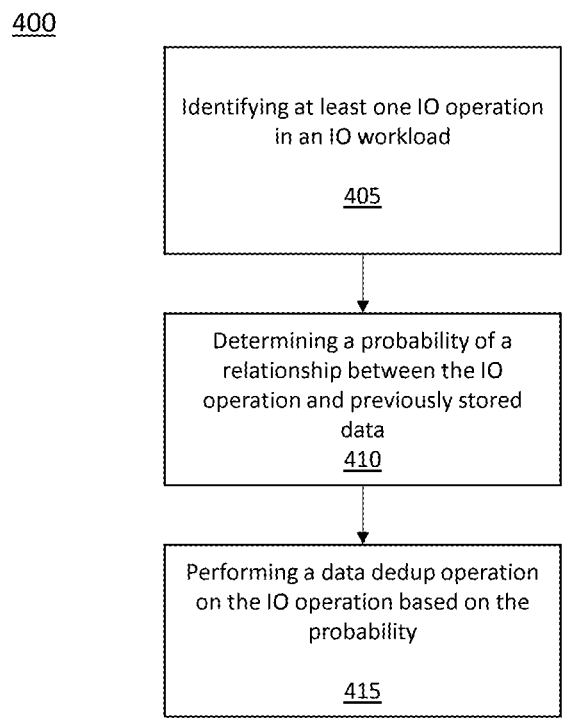
FIG. 4 is a flow diagram of a method for performing data dedup in accordance with example embodiments disclosed herein.
Figure 5:
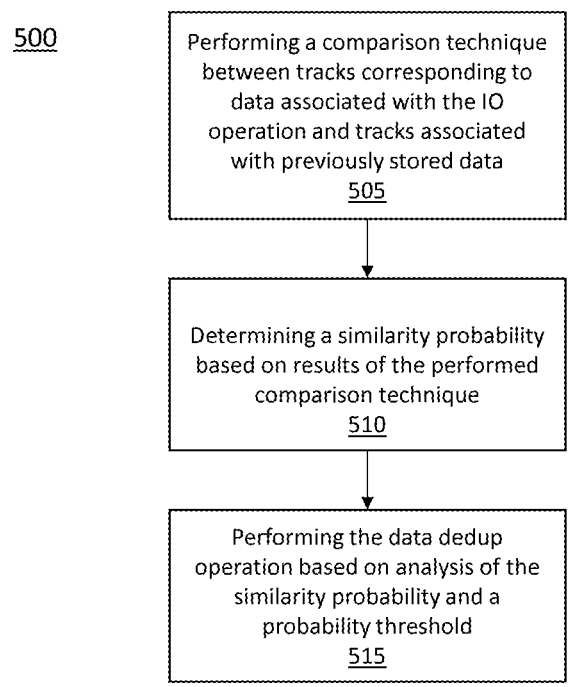
FIG. 5 is a flow diagram of another method for performing data dedup in accordance with example embodiments disclosed herein.

FIGS. 4-5 illustrate methods and/or flow diagrams per this disclosure. For simplicity of explanation, the methods are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter.

Referring to FIG. 4, in embodiments, a method 400 can be executed by a dedup controller (e.g., controller 110 of FIG. 1). The method 400, at 405, can include identifying at least one input/output (IO) operations in an IO workload received by a storage array. In embodiments, each of the IOs can relate to a data track of the storage array. At, 410, the method 400 can further include determining a probability of the at least one IO being similar to a previous stored IO. Additionally, the method 400, at 415, can include performing a data deduplication (dedup) operation on the at least one IO based on the probability. In embodiments, the probability can be less than one hundred (100) percent.

It should be noted that each step of the method 400 can be performed according to any of the techniques described herein, known to those skilled in the art, and/or yet to be known to those skilled in the art.

Referring to FIG. 5, in embodiments, a method 500 can be executed by a dedup controller (e.g., controller 110 of FIG. 1). The method 500, at 505, can include performing a comparison technique between at least a subset of tracks related to the time series fingerprint and a corresponding subset of tracks related to the previously stored set of sequential IOs' time series fingerprint. At, 510, the method can further include determining the probability of the similarity between the at least one set of sequential IOs and the previously previous stored set of sequential IOs based on a number of matching tracks identified by the comparison technique. Additionally, the method 500, at 515, can include performing the data dedup operation on the at least set of sequential IOs based an analysis of the similarity probability and a probability threshold.

It should be noted that each step of the method 500 can be performed according to any of the techniques described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein can be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus having at least one processor configured to:

identify two or more input/output (IO) operations in an IO workload received by a storage array, wherein each IO relates to a data track of the storage array, wherein identifying the two or more IO operations includes identifying a set of sequential IOs in the IO workload, and wherein identifying the set of sequential IOs includes performing a time dimensional comparison between the IO workload's IOs and their corresponding data tracks, wherein the time dimensional comparison includes performing a time series comparison using the set of sequential IOs' corresponding receive timestamp and their related data tracks' corresponding write timestamps;

determine a probability of the at least one IO being similar to a previous stored IO; and perform a data deduplication (dedup) operation on the at least one IO based on the probability, wherein the probability is less than one hundred (100) percent.

2. The apparatus of claim 1 further configured to:

generate one or more data track fingerprints representing data of each data track identified by the set of sequential IOs; and store the one or more data track fingerprints in a searchable data structure.

3. The apparatus of claim 2 further configured to analyze a temporal dimension of each data track identified by the set of sequential IOs.

4. The apparatus of claim 3 further configured to convert a plurality of unique fingerprints representing the set of sequential IOs into a time series fingerprint, wherein each time-series fingerprint represents a time step representing each data track related to the set of sequential IOs.

5. The apparatus of claim 4 further configured to compare the time series fingerprints with corresponding previously stored set of sequential IOs' time series fingerprints.

6. The apparatus of claim 5 further configured to perform a comparison technique between at least a subset of tracks related to the time series fingerprints and a corresponding subset of tracks related to the previously stored set of sequential IOs' time series fingerprints.

7. The apparatus of claim 6 further configured to select a number of tracks to include in a subset track comparison based on a threshold statistical relevancy.

8. The apparatus of claim 6 further configured to determine the probability of the similarity between the at least one set of sequential IOs and the previously previous stored set of sequential IOs based on a number of matching tracks identified by the comparison technique.

9. The apparatus of claim 6 further configured to perform the comparison technique using a time series comparison system, wherein the time series comparison system includes dynamic time warp (DTW) processor instructions.

10. The apparatus of claim 8 further configured to perform the data dedup operation on the at least one set of sequential IOs based on an analysis of the similarity probability and a probability threshold.

11. A method comprising:

identifying two or more input/output (IO) operations in an IO workload received by a storage array, wherein each IO relates to a data track of the storage array, wherein identifying the two or more IO operations includes identifying a set of sequential IOs in the IO workload, and wherein identifying the set of sequential IOs includes performing a time dimensional comparison between the IO workload's IOs and their corresponding data tracks, wherein the time dimensional comparison includes performing a time series comparison using the set of sequential IOs' corresponding receive timestamp and their related data tracks' corresponding write timestamps;

determining a probability of the at least one IO being similar to a previous stored IO; and performing a data deduplication (dedup) operation on the at least one IO based on the probability, wherein the probability is less than one hundred (100) percent.

12. The method of claim 11 further comprising:

generating one or more data track fingerprints representing the data of each data track identified by the set of sequential IOs; and storing the one or more data track fingerprints in a searchable data structure.

13. The method of claim 12 further comprising analyzing a temporal dimension of each data track identified by the set of sequential IOs.

14. The method of claim 13 further comprising converting a plurality of unique fingerprints representing the set of sequential IOs into a time series fingerprint, wherein each time-series fingerprint represents a time step representing each data track related to the set of sequential IOs.

15. The method of claim 14 further comprising comparing the time series fingerprints with corresponding previously stored set of sequential IOs' time series fingerprints.

16. The method of claim 15 further comprising performing a comparison technique between at least a subset of tracks related to the time series fingerprint and a corresponding subset of tracks related to the previously stored set of sequential IOs' time series fingerprints.

17. The method of claim 16 further comprising selecting a number of tracks to include in a subset track comparison based on a threshold statistical relevancy.

18. The method of claim 16 further comprising determining the probability of the similarity between the at least one set of sequential IOs and the previously previous stored set of sequential IOs based on a number of matching tracks identified by the comparison technique.

19. The method of claim 16 further comprising performing the comparison technique using a time series comparison system, wherein the time series comparison system includes dynamic time warp (DTW) time series comparison algorithm.

20. The method of claim 18 further comprising performing the data dedup operation on the at least one set of sequential IOs based on an analysis of the similarity probability and a probability threshold.

* * * * *